United States Patent
Herbach et al.

(10) Patent No.: US 10,796,581 B2
(45) Date of Patent: *Oct. 6, 2020

(54) FALLBACK REQUESTS FOR AUTONOMOUS VEHICLES

(71) Applicant: WAYMO LLC, Mountain View, CA (US)

(72) Inventors: Joshua Seth Herbach, San Francisco, CA (US); Philip Nemec, San Jose, CA (US); Nathaniel Fairfield, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,944

(22) Filed: May 15, 2019

(65) Prior Publication Data

US 2019/0287409 A1    Sep. 19, 2019

Related U.S. Application Data

(63) Continuation of application No. 15/153,117, filed on May 12, 2016, now Pat. No. 10,475,345, which is a
(Continued)

(51) Int. Cl.
*G08G 1/00* (2006.01)
*G06F 9/48* (2006.01)
(Continued)

(52) U.S. Cl.
CPC .......... *G08G 1/202* (2013.01); *B60W 50/029* (2013.01); *G05D 1/0088* (2013.01);
(Continued)

(58) Field of Classification Search
CPC ....................................................... G08G 1/202
(Continued)

(56) References Cited

U.S. PATENT DOCUMENTS 5,327,557 A    7/1994  Emmond
5,521,579 A    5/1996  Bernhard
(Continued)

FOREIGN PATENT DOCUMENTS

CN    103253273 A    8/2013
CN    103339009 A    10/2013
(Continued)

OTHER PUBLICATIONS

Kato, Shinpei, et al. "An open approach to autonomous vehicles." IEEE Micro 35.6 (2015): pp. 60-68. (Year: 2015).*
(Continued)

*Primary Examiner* — Satish Rampuria
(74) *Attorney, Agent, or Firm* — Botos Churchill IP Law

(57) ABSTRACT

Aspects of the present disclosure relate to a system having a memory, a plurality of self-driving systems for controlling a vehicle, and one or more processors. The processors are configured to receive at least one fallback task in association with a request for a primary task and at least one trigger of each fallback task. Each trigger is a set of conditions that, when satisfied, indicate when a vehicle requires attention for proper operation. The processors are also configured to send instructions to the self-driving systems to execute the primary task and receive status updates from the self-driving systems. The processors are configured to determine that a set of conditions of a trigger is satisfied based on the status updates and send further instructions based on the associated fallback task to the self-driving systems.

20 Claims, 10 Drawing Sheets

Related U.S. Application Data continuation of application No. 14/721,604, filed on May 26, 2015, now Pat. No. 9,368,026.

(51) Int. Cl.
| | | |
|---|---|---|
| G06F 9/54 | (2006.01) | |
| B60W 50/029 | (2012.01) | |
| G05D 1/02 | (2020.01) | |
| G05D 1/00 | (2006.01) | |
| G06F 9/46 | (2006.01) | |
| B60W 50/00 | (2006.01) | |

(52) U.S. Cl.
CPC ............. *G05D 1/0297* (2013.01); *G06F 9/46* (2013.01); *G06F 9/4881* (2013.01); *G06F 9/546* (2013.01); *G08G 1/00* (2013.01); *B60W 2050/0005* (2013.01); *B60W 2050/0006* (2013.01); *B60W 2530/209* (2020.02); *G05D 2201/0213* (2013.01)

(58) Field of Classification Search
USPC .................................................. 718/1–108
See application file for complete search history.

(56) References Cited

U.S. PATENT DOCUMENTS

| | | |
|---|---|---|
| 5,774,668 A | 6/1998 | Choquier et al. |
| 5,835,870 A | 11/1998 | Kagawa |
| 5,838,562 A | 11/1998 | Gudat et al. |
| 5,906,645 A | 5/1999 | Kagawa et al. |
| 5,926,463 A | 7/1999 | Ahearn et al. |
| 5,930,511 A | 7/1999 | Hinsley |
| 5,956,665 A | 9/1999 | Martinez et al. |
| 6,131,119 A | 10/2000 | Fukui |
| 6,185,487 B1 | 2/2001 | Kondo et al. |
| 6,282,175 B1 | 8/2001 | Steele et al. |
| 6,862,732 B1 | 3/2005 | Schultz et al. |
| 8,190,322 B2 | 5/2012 | Lin et al. |
| 8,352,112 B2 | 1/2013 | Mudalige |
| 8,461,803 B2 | 6/2013 | Cohen et al. |
| 8,818,696 B2 | 8/2014 | Klooster et al. |
| 8,825,226 B1 | 9/2014 | Worley et al. |
| 8,836,490 B2 | 9/2014 | Silzer et al. |
| 8,854,001 B2 | 10/2014 | Cohen et al. |
| 8,874,305 B2 | 10/2014 | Dolgov et al. |
| 9,552,564 B1 | 1/2017 | Martenis |
| 2005/0132024 A1 | 6/2005 | Habaguchi et al. |
| 2007/0005202 A1* | 1/2007 | Breed ............... B60W 50/0205 701/29.1 |
| 2010/0286845 A1 | 11/2010 | Rekow et al. |
| 2012/0083959 A1* | 4/2012 | Dolgov ................... G01S 17/86 701/23 |
| 2013/0145482 A1* | 6/2013 | Ricci ................... G06F 3/04883 726/28 |
| 2013/0290970 A1 | 10/2013 | Shah et al. |
| 2014/0136414 A1* | 5/2014 | Abhyanker ............ G06Q 50/28 705/44 |
| 2014/0156133 A1* | 6/2014 | Cullinane .............. B60K 35/00 701/23 |
| 2014/0249693 A1 | 9/2014 | Stark et al. |
| 2014/0309814 A1 | 10/2014 | Ricci et al. |
| 2014/0342834 A1 | 11/2014 | Tappeiner et al. |
| 2015/0032293 A1 | 1/2015 | O'Neill et al. |
| 2015/0051778 A1 | 2/2015 | Mueller |
| 2015/0051779 A1 | 2/2015 | Camacho-Cook et al. |
| 2016/0033297 A1 | 2/2016 | Konishi et al. |

FOREIGN PATENT DOCUMENTS

| | | |
|---|---|---|
| CN | 103339010 A | 10/2013 |
| CN | 103402839 A | 11/2013 |
| EP | 2390862 A2 | 11/2011 |
| JP | 2006126107 A | 5/2006 |
| JP | 2010134945 A | 6/2010 |
| JP | 2011240816 A | 12/2011 |
| JP | 2012220286 A | 11/2012 |
| JP | 2013162847 A | 8/2013 |
| JP | 2013544697 A | 12/2013 |
| JP | 2015072651 A | 4/2015 |
| JP | 2015092320 A | 5/2015 |
| WO | 2010060720 A2 | 6/2010 |
| WO | 2013162847 A1 | 10/2013 |
| WO | 2015166811 A1 | 11/2015 |

OTHER PUBLICATIONS

Wei, Junqing, et al. "Towards a viable autonomous driving research platform." 2013 IEEE Intelligent Vehicles Symposium (IV). IEEE , 2013.pp. 763-770 (Year: 2013).*

Li, Qing, Nanning Zheng, and Hong Cheng. "Springrobot: A prototype autonomous vehicle and its algorithms for lane detection." IEEE Transactions on Intelligent Transportation Systems 5.4 (2004): pp. 300-308. (Year: 2004).*

Frazzoli, Emilio, Munther A. Dahleh, and Eric Feron. "Maneuver-based motion planning for nonlinear systems with symmetries." IEEE transactions on robotics 21.6 (2005): pp. 1077-1091. (Year: 2005).*

Frazzoli, Emilio, Munther A. Dahleh, and Eric Feron. "Robust hybrid control for autonomous vehicle motion planning." Proceedings of the 39th IEEE Conference on Decision and Control (Cat. No. 00CH37187). vol. 1. IEEE, 2000.pp. 821-826 (Year: 2000).*

Gavrilets, Vladislav, et al. "Aggressive maneuvering of small autonomous helicopters: A human-centered approach." The International Journal of Robotics Research 20.10 (2001): pp. 795-807. (Year: 2001).*

First Office Action for Chinese Patent Application No. 201680037342. 8, dated Jul. 24, 2018.

International Search Report and Written Opinion for PCT Application No. PCT/US2016/033728 dated Sep. 2, 2016.

Marshall Hartman, Autonomous Driving: Developing Failsafe Systems and Smart Sensor Technology to Improve Safety, printed on Mar. 11, 2015, <http://www.pitt.edu/~mdh78/Trends.html>.

Office Action for Japanese Patent Application No. 2017-560197 dated May 28, 2018.

Second Office Action for Chinese Patent Application No. 201680037342. 8, dated Dec. 6, 2018.

Bill McBeath, How the Internet-of-Things is Transforming Mining, Published on Nov. 13, 2014, <http://www.clresearch.com/research/detail.cfm?guid=A5E6FEAF-3048-79ED-99C9-EA62EBCCD605>, Nov. 13, 2014.

O'Connor, Michael, et al. "Automatic steering of farm vehicles using GPS." Precision Agriculture precisionagricu3 (1996)., 1996, pp. 767-777.

Kapellos, Konstantinos, et al. "Specification, formal verification and implementation of tasks and missions for an autonomous vehicle." Experimental Robotics IV. Springer Berlin Heidelberg., 1997, pp. 412-421.

Bertozzi, Massimo, Alberto Broggi, and Alessandra Fascioli. "Vision-based intelligent vehicles: State of the art and perspectives." Robotics and Autonomous systems 32.1 (2000)., 2000, pp. 1-16.

Rajamani, Rajesh, et al. "A complete fault diagnostic system for automated vehicles operating in a platoon." IEEE transactions on control systems technology 9.4., 2001, pp. 553-564.

Antonucci, E., F. Garzia, and G. M. Veca. "The automatic vehicles access control system of the historical centre of Rome." WIT Transactions on Ecology and the Environment 54 (2002)., 2002, pp. 853-861.

Isermann, Rolf. "Model-based fault-detection and diagnosis-status and applications." Annual Reviews in control 29.1., 2005, pp. 71-85.

Anthony, Richard, et al. "Towards a dynamically reconfigurable automotive control system architecture." Embedded System Design: Topics, Techniques and Trends. Springer, Boston, MA., 2007, pp. 71-84.

(56) References Cited

OTHER PUBLICATIONS

Leonard, John, et al. "A perception-driven autonomous urban vehicle." Journal of Field Robotics 25.10 (2008): pp. 727-774., 2008, pp. 727-774.

Kim, Junsung, et al. "Parallel scheduling for cyber-physical systems: Analysis and case study on a self-driving car." Proceedings of the ACM/IEEE 4th International Conference on Cyber-Physical Systems. ACM., 2013, pp. 31-40.

Anonymous: "Autonome Fahrzeuge: Roboterautos als Autos der Zukunfl schon heute." Autonomes Fahren & Co. XP055297193. Retrieved from the Internet: <http://www.autonomes-fahren.de/autonome-ahrzeuge-die-zukunft-der-automobilital/>, Jul. 17, 2011, 6 pp.

Hafid Niniss, Development of an Autonomous UAV Managed by Virtual Reality, <http://flp.forum8.co.jp/forum8lib/pdf/UAV.pdf>, Sep. 9, 2012.

Japanese Notice of Reasons for Rejection for Application No. 2018-231175 dated Feb. 13, 2020.

\* cited by examiner

FALLBACK REQUESTS FOR AUTONOMOUS VEHICLES

CROSS-REFERENCE TO RELATED APPLICATIONS

The present application is a continuation of U.S. patent application Ser. No. 15/153,117, filed May 12, 2016, which application is a continuation of U.S. patent application Ser. No. 14/721,604, filed May 26, 2015, now U.S. Pat. No. 9,368,026, issued on Jun. 14, 2016, the disclosures of which are incorporated herein by reference.

BACKGROUND OF THE INVENTION

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY OF THE INVENTION

One aspect of the disclosure provides a system. The system includes a memory, a plurality of self-driving systems for controlling a vehicle, and one or more processors. The one or more processors are configured to receive at least one fallback task in association with a request for a primary task and at least one trigger of each fallback task, each trigger being a set of conditions that, when satisfied, indicate when a vehicle requires attention for proper operation; send a first set of instructions to one or more self-driving systems to execute the primary task; receive status updates from the self-driving systems; determine that a set of conditions of a trigger is satisfied based at least in part on the status updates; and send a second set of instructions to one or more self-driving systems based on the fallback task associated with the trigger.

In one example, each set of conditions is different for each trigger. In the same example, the one or more processors are also configured to determine that a set of conditions of a trigger has been satisfied. In another example, a base location is hardcoded on the memory, and the one or more processors are also configured to determine that the fallback task associated with the trigger is non-executable and update the fallback task to be driving to the base location.

In yet another example, the one or more processors are also configured to send a status update report based on the status update from the self-driving systems, receive at least one updated fallback task, and store the at least one updated fallback task in the memory. In this example, the one or more processors are also configured to update at least one fallback task based on the at least one updated fallback task.

In a further example, the one or more processors are also configured to determine that the set of conditions of the trigger are no longer satisfied; and, when one or more conditions of the trigger are determined to no longer be satisfied, send a third set of instructions to one or more self-driving systems to autonomously resume the primary task. In yet another example, the one or more processors are also configured to determine a level of urgency of the trigger, the level of urgency being related to how quickly the fallback task associated with the trigger is executed after the set of conditions of the trigger is satisfied; and send the second set of instructions before the primary task is completed when the level of urgency of the trigger is a certain level.

In another example, the second set of instructions includes instructions that cause the self-driving systems to stop executing the primary task. In a further example, the one or more processors are also configured to determine which fallback task is associated with the trigger by accessing a mapping of each trigger to corresponding fallback tasks. In yet another example, the system also includes the vehicle. In this example, the vehicle will not start if a base location is not stored on the memory.

Another aspect of the disclosure provides a fleet management system. The fleet management system includes a server configured to receive updates regarding the status of a plurality of vehicles capable of autonomously driving; and send a dispatch command to one of the vehicles, the dispatch command including a request for a primary task, at least one fallback task, and at least one trigger of each fallback task, each trigger being a set of conditions that, when satisfied, indicate when a vehicle requires attention for proper operation.

In one example, the server is also configured to send at least one updated fallback task in response to the received updates. In another example, the dispatch command also includes a level of urgency for each trigger, the level of urgency being related to how quickly the fallback task associated with the trigger is executed after the set of conditions of the trigger is satisfied.

In a further example, the server is also configured to determine one or more fallback locations that one of the vehicles may drive to when executing at least one fallback task. In this example, the dispatch command also includes the one or more fallback locations. In another example, the system also includes the plurality of vehicles capable of autonomously driving.

Yet another aspect of the disclosure provides a system. The system includes a plurality of self-driving systems for controlling a vehicle, one or more processors, and a memory. The memory includes a trip manager module comprising instructions that, when executed, cause the one or more processors to send a first set of instructions to one or more self-driving systems to execute a primary task, and send a second set of instructions to one or more self-driving systems to execute a fallback task associated with a trigger, the trigger being a set of conditions that, when satisfied, indicate when a vehicle requires attention for proper operation. The memory also includes a task overseer module comprising instructions that, when executed, cause the one or more processors to receive vehicle status updates from the trip manager module, determine that the set of conditions of a trigger is satisfied based on a current vehicle status received from the trip manager module, and send information to the trip manager module based on the fallback task associated with the set of conditions of the trigger that is satisfied.

In one example, the task overseer module also includes instructions that, when executed, cause the one or more processors to determine a level of urgency of the trigger, the level of urgency being related to how quickly the fallback task associated with the trigger is executed after the set of conditions of the trigger is satisfied, wherein the indication includes the level of urgency. In this example, the trip manager module also includes instructions that, when executed, cause the one or more processors to send the second set of instructions with instructions to stop executing the primary task.

In another example, the task overseer module also includes instructions that, when executed, cause the one or more processors to determine which fallback task is associated with the trigger by accessing a mapping of each trigger to corresponding fallback tasks. In yet another example, the system also includes the vehicle.

DETAILED DESCRIPTION

Overview

The technology relates to an autonomous vehicle for autonomously setting and executing fallback requests. Fallback tasks may include tasks that the vehicle's computers may perform in the event the autonomous vehicle cannot operate normally. For example, some fallback tasks may involve safely coming to a quick stop, especially in the case of emergency situations such as if there is a vehicle malfunction or an accident. Other fallback tasks involve driving for an extended period of time to another location that is either preset or determined based on a status of the vehicle. These types of fallback tasks are useful in situations such as when the vehicle is low on fuel/energy, detects slight sensor degradation, loses connection to a fleet management server, or for whatever reason lacks any specific executable instructions as to what to do next after completing any other higher priority tasks. In these situations, the vehicle is still capable of safely driving for a length of time and therefore capable of executing fallback tasks involving continued driving. Having the vehicle drive itself to a place to get serviced or resume connection is preferable to stopping in a location where someone would have to travel to the vehicle's stopped location in order to service or retrieve the vehicle.

A computing device in an autonomous vehicle may contain instructions for discrete tasks. Instructions for a particular task may form a single module. There may be a trip manager module that may contain instructions for navigating and maneuvering the vehicle between locations. There may also be a task overseer module that may contain instructions for processing received task requests. The task overseer module may also contain instructions for determining when tasks should be performed in relation to one another; in other words, managing a task queue. In addition, the task overseer module may include a sub-module dedicated to managing fallback tasks, the fallback selector module. The fallback selector module may contain instructions for processing received fallback tasks and determining which fallback task to execute and when.

Figure 5:
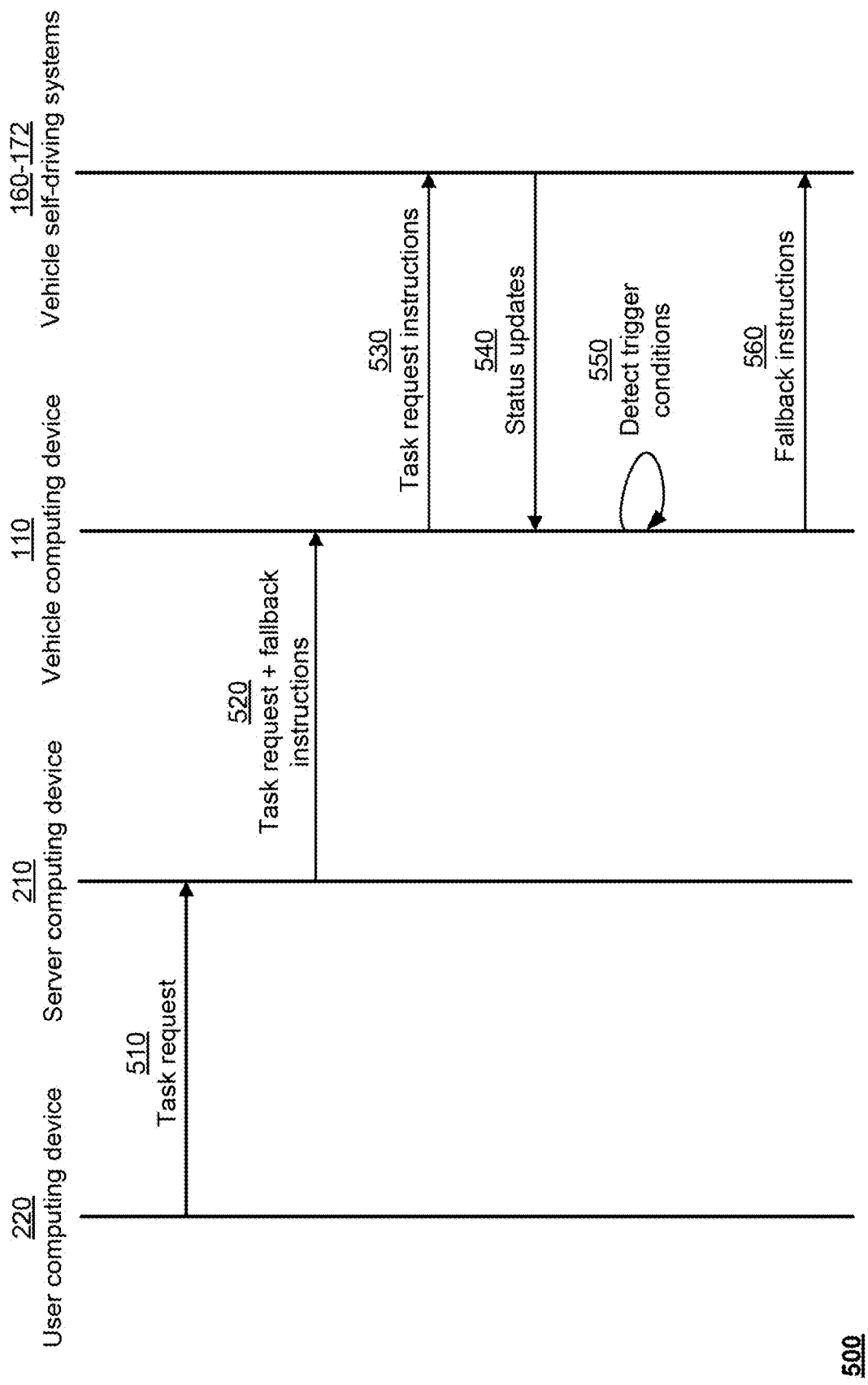
FIG. 5 is an example diagram in accordance with aspects of the disclosure.

A remote dispatching system may send information for one or more fallback tasks to a vehicle in response to, along with, or independent from a passenger-related or non-passenger task request. Passenger-related task requests, or trip requests, may provide information such as a pickup location and a destination location for the trip. Non-passenger tasks may include pre-positioning, refueling/recharging, parking, going for maintenance, circling the block, and updating software. The fallback selector module may receive and process the fallback task. In some examples, as shown in FIG. 5, every passenger-related or non-passenger task request is sent with fallback instructions that may cause the vehicle to perform a fallback task if the vehicle for whatever reason cannot complete the passenger-related or non-passenger task.

The passenger-related or non-passenger tasks may be initiated by a user via a client computing device. The user may send information for a passenger-related or non-passenger task to the dispatching system. The dispatching system may then send the task request to the to the vehicle's computing devices, where it is received and processed by the task overseer module. One or more fallback tasks may be sent to the vehicle's computing devices in association with the task request. Fallback tasks are tasks that are performed under specific conditions, usually exigent conditions such as when the autonomous vehicle cannot operate normally. The received passenger-related or non-passenger tasks may then be stored by the task overseer module in a queue in one or more computing devices in the vehicle, and the received fallback tasks may be stored separately in the memory by the fallback selector module.

For example, fallback information regarding a base location, or a location for the vehicle to travel to when no other fallbacks tasks can be executed, may be sent to the system from a user computing device. The information may then be forwarded to the vehicle. Alternatively, a server in the system may determine and send information for a fallback task to the vehicle without receiving any user input. For example, the server may determine that maintenance is needed for a degraded sensor and may also determine the closest maintenance depot that can fix the sensor based on the current location of the vehicle and map data.

Fallback instructions may include certain information depending on the nature of a fallback task. For example, for tasks that involve driving to a type of location, such as a charging station or maintenance garage, the location or region may be specified in the fallback instructions. Information, such as the destination location of a driving task, may be determined by the vehicle's computing device, or hardcoded on the vehicle's computing device. In some examples, there may be multiple locations hardcoded into the vehicle, and the vehicle's computing device may determine which of the multiple locations to travel to after factoring in proximity, services offered, load level, and other considerations. In addition, for tasks that require actions other than driving and parking, such as interaction with an outside system, the instructions may also include action-specific details like authentication information for fueling systems or maintenance depots.

Fallback instructions may also include one or more triggers. A trigger may include one or more conditions that, when satisfied, indicate that the vehicle should execute the fallback task. Conditions may include, for example, the vehicle's fuel or energy level meeting a predetermined threshold, the connection between the vehicle's computing device and the server of the fleet management device being lost, the vehicle's task queue being empty, and a regular maintenance being scheduled at a particular time.

To determine when the condition or conditions of a particular trigger are met, the vehicle self-driving systems may transmit status updates periodically and/or continuously to the vehicle's computing device. As an example, status updates may include information such as the fuel level or other internal or external measurements from instruments or sensors of the vehicle. As shown in FIG. 5, the vehicle's computing device may use the status updates to determine that the one or more conditions of the relevant trigger are met. For example, a fuel indicator may continually monitor the level of fuel in the tank. The task overseer module of the vehicle's computing device may set a threshold level for the amount of fuel based on the fuel economy of the vehicle, density of gas stations in the area, and other factors that represents the amount of fuel likely needed to reach a nearby gas station. The task overseer module of the vehicle's computing device may then monitor the level of fuel and determine when it reaches the threshold.

After the condition or conditions of a particular trigger are met, a fallback task may be triggered, and the fallback selector module of vehicle's computing device may send instructions to execute any fallback task or tasks corresponding to the particular trigger as shown in FIG. 5. For example, when the fuel level reaches the threshold as defined as the trigger, the fallback selector module may then send instructions to execute the fallback task of driving to the nearest gas station. This may include determining the location of the nearest gas or charging station based on the current location of the vehicle and the shortest route to that gas or charging station.

In some instances, autonomous vehicle may be performing another task when a fallback task is triggered. In this regard, the fallback instructions of a particular fallback task that has been triggered may include additional instructions for transitioning from the executing the other task to executing the particular fallback task. The additional instructions may also include an indication of whether the particular fallback task should be executed immediately, after the completion of the other task, or after some other specified task in the queue. This indication may be based on the urgency of the trigger or the importance of the particular fallback task. A designation of a level of urgency of the trigger or a level of priority of the fallback task may be included in the instructions. The level may be designated as high, intermediate, or low.

Figure 6:
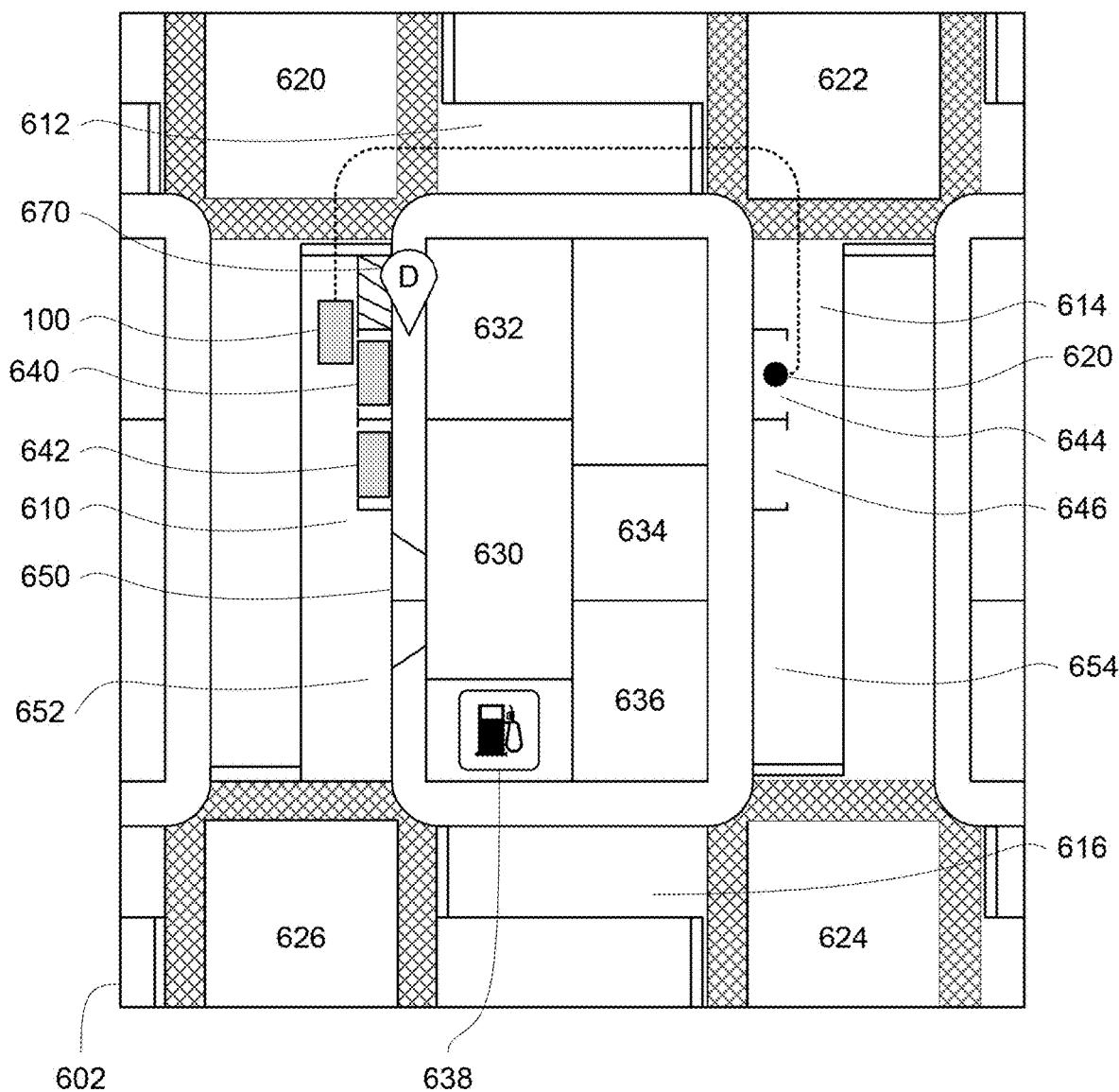
FIG. 6 is an example bird's eye view of a geographic area in accordance with aspects of the disclosure.

In some examples, when the vehicle is currently executing a passenger-related task, the fallback task may be executed after the trip is completed. As shown in FIG. 6, after dropping off a passenger and thus completing a passenger-related task, a vehicle may have no other tasks in the queue and no further instructions from the dispatching system. In this situation, the vehicle may perform the fallback task of parking nearby until further instructions are received. In another situation, shown in FIG. 7, a refueling fallback task may be triggered while performing a passenger-related task, but still may be executed after the completion of the passenger-related task. In this case, the vehicle's computing device may have determined that there was enough fuel to reach the destination then travel to the nearest gas station. However, if the triggering action is urgent, the fallback selector module of the vehicle's computing device may send instructions to end the trip prematurely, which may or may not include unloading the passengers, and proceed to execute the fallback task. These situations may involve a problem with the vehicle that can prevent the vehicle from completing the trip. Another autonomous vehicle may be sent to pick up the passengers and complete the rest of the trip if they have disembarked the vehicle.

Figure 8:
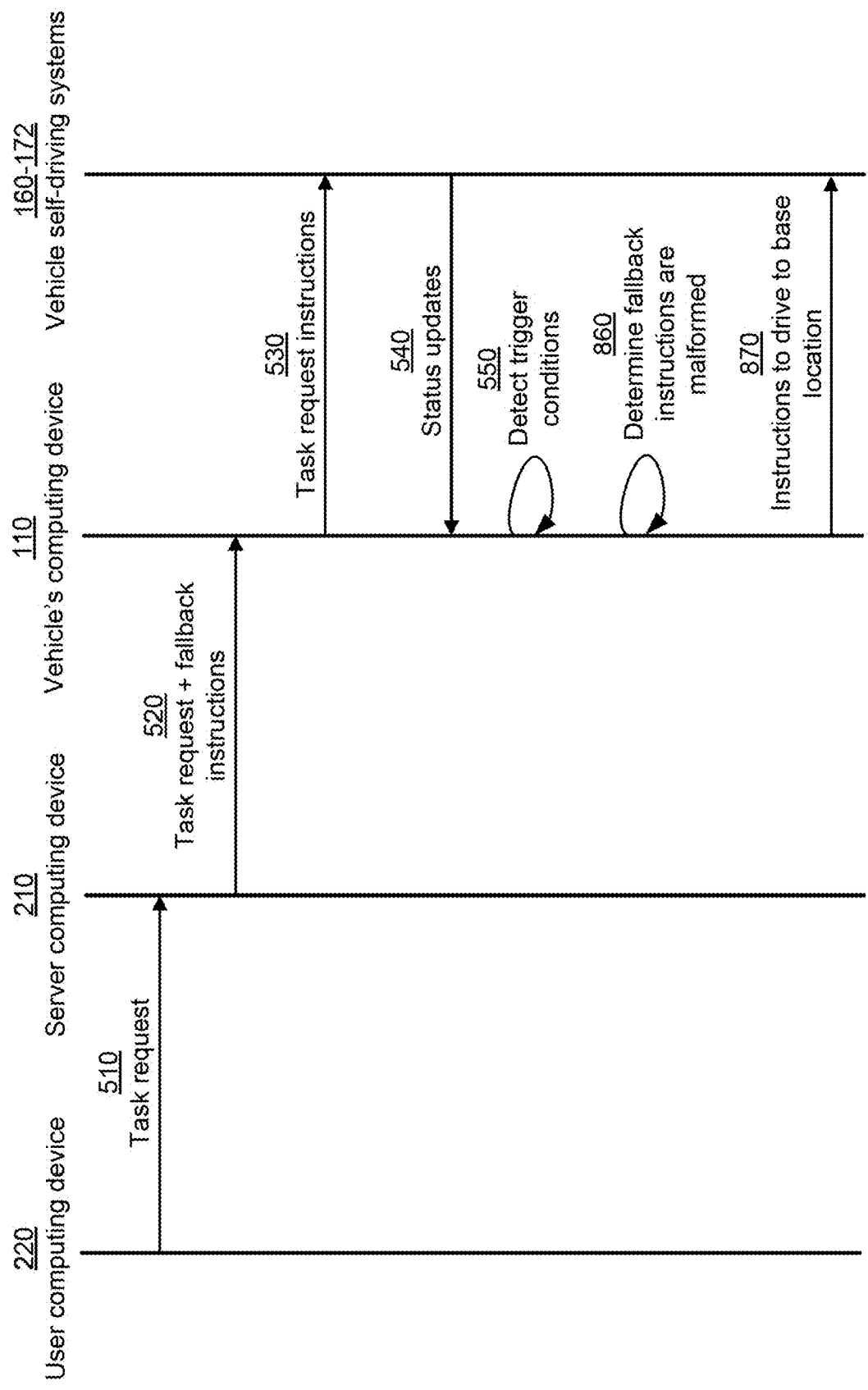
FIG. 8 is another example diagram in accordance with aspects of the disclosure.

If a fallback task cannot be executed because the fallback instructions for performing the fallback task are malformed or any other reason and has not been replaced by another fallback task, the fallback selector module may send instructions to maneuver the autonomous vehicle to a base location when the fallback task with malformed or otherwise defective instructions is triggered, as shown in FIG. 8. Alternatively, the vehicle may be driven to the base location when no other fallback instructions have been received. The address or location coordinates of the base location may be hardcoded into the vehicle. In some examples, the address or location coordinates of multiple base locations may be hardcoded, allowing the fallback selector module of the vehicle's computing device to select and maneuver the vehicle to the closest or most convenient base location depending on when the fallback task is triggered. In one example, the vehicle will not start if no base location has been set for the vehicle, guaranteeing that there is a location for the vehicle to go to as a last resort whenever the vehicle is in operation, thus reducing the risk of an autonomous vehicle being stranded.

If an autonomous vehicle cannot reach the location specified in the fallback instructions or the base location because of some external and/or internal factors, the fallback selector module of the vehicle's computing device may then pull the vehicle over and send a message to the dispatching system. The message may include the vehicle's location and/or the list of external and/or internal factors.

In some situations, conditions may change such that the condition or conditions of a trigger of a current fallback task which the vehicle is currently performing are no longer met. The fallback selector module may determine whether this happens. When the condition or conditions are no longer met, the vehicle may continue executing the current fallback task or return to executing the regularly scheduled tasks in the task queue according to the additional instructions of the fallback task. Returning to execute a regularly scheduled task may mean performing a task that may have been interrupted by the current fallback task or a next task in the queue.

Figure 9:
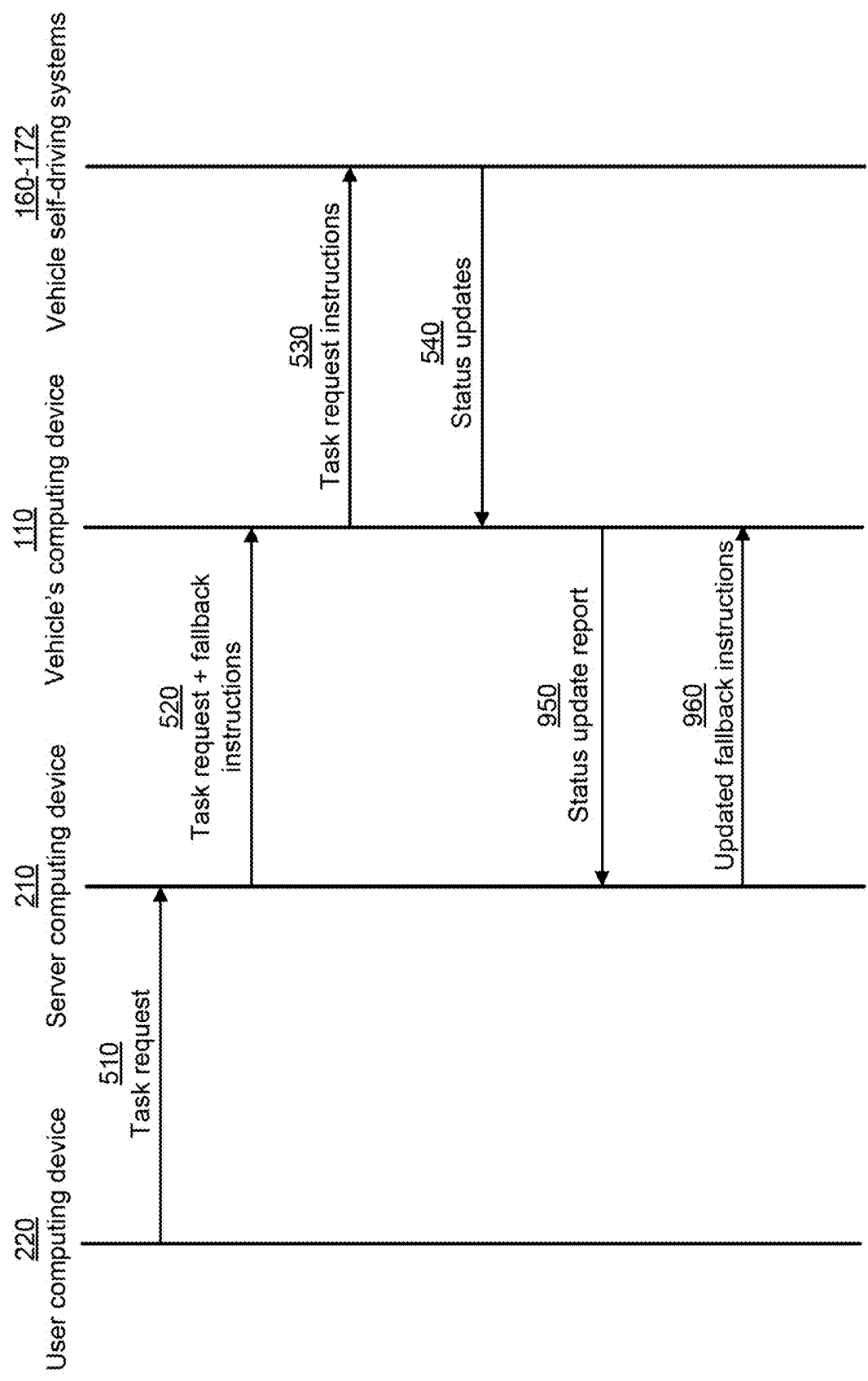
FIG. 9 is a further example diagram in accordance with aspects of the disclosure.

Additionally or alternatively, the computing device may send status update reports to the dispatching system. Based on the status update reports, the dispatching system may send updated fallback instructions to the autonomous vehicle, as shown in FIG. 9. The fallback selector module may replace the previously received fallback instructions with the updated fallback task information. In some examples, the previously sent fallback task may have been sent in conjunction with a task request. However, in other examples, the updated fallback task may be stored in the vehicle's computing device along with the previously sent fallback task(s).

Example Systems

Figure 1:
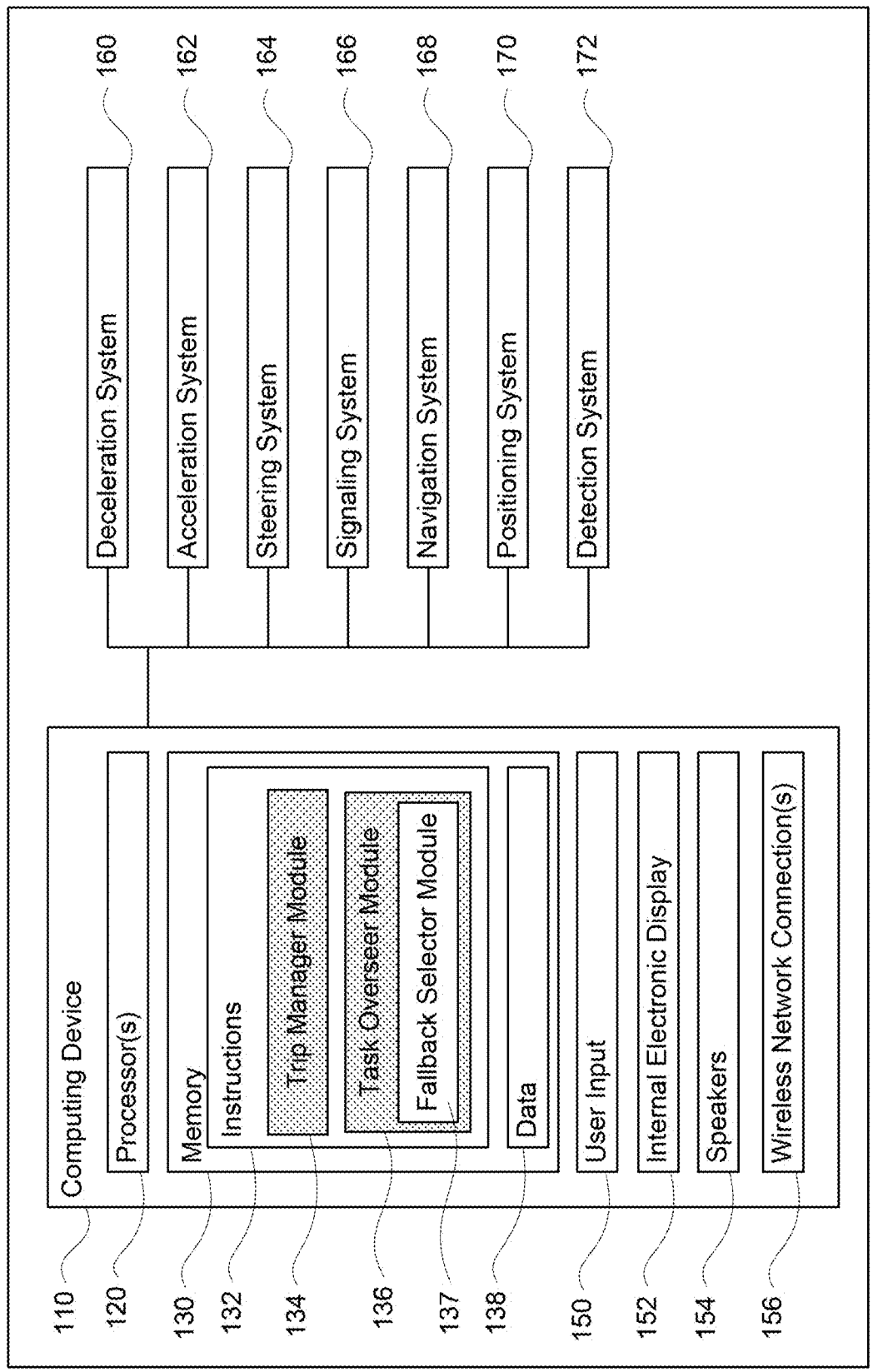
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 138 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The instructions may include instructions for completing a particular task. For example, a trip manager module 134 that may contain instructions for navigating and maneuvering the vehicle between locations. There may also be a task overseer module 136 that may contain instructions for processing received task requests. The task overseer module 136 may also contain instructions for determining when tasks should be performed in relation to one another; in other words, managing a task queue. In addition, the task overseer module 136 may include a sub-module dedicated to managing fallback tasks, the fallback selector module 137. The fallback selector module 137 may contain instructions for processing received fallback tasks and determining which fallback task to execute and when.

The data 138 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 138 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 4:
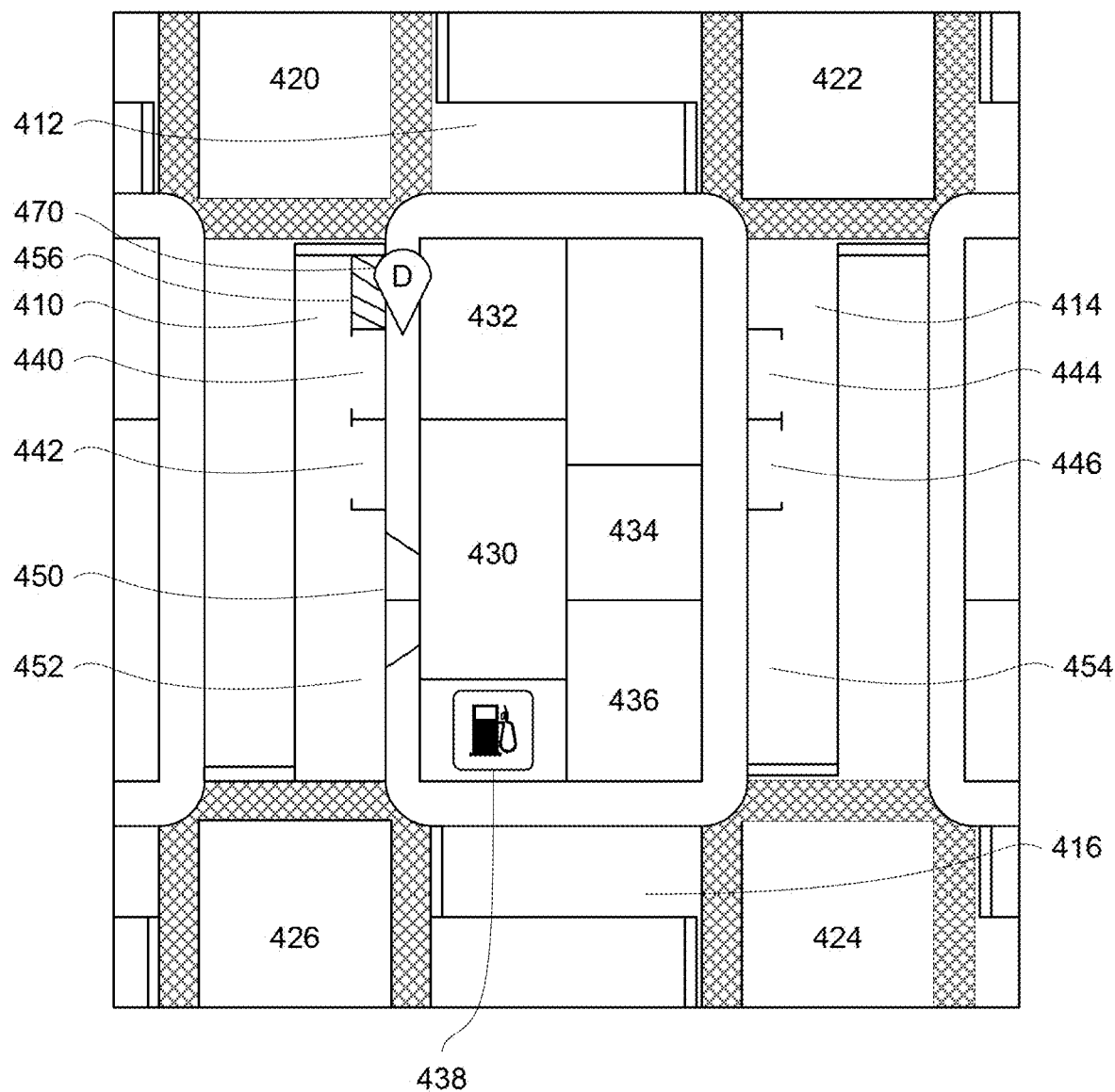
FIG. 4 is an example map in accordance with aspects of the disclosure.

FIG. 4 is an example of a map 400. In this example, the map includes a plurality of different features that identify the shape and location of various features such as lanes 410-416, intersections 420-426, buildings 430-436, fueling station 438, parking spaces 440-446, a driveway entrance (for example to a parking garage or other location) 450, shoulder areas 452-454, and no parking zone 456. Together, these features correspond to a single city block. The map 400 may be a part of the detailed maps described above and used by the various computing devices of vehicle 100 in order to maneuver the vehicle 100.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
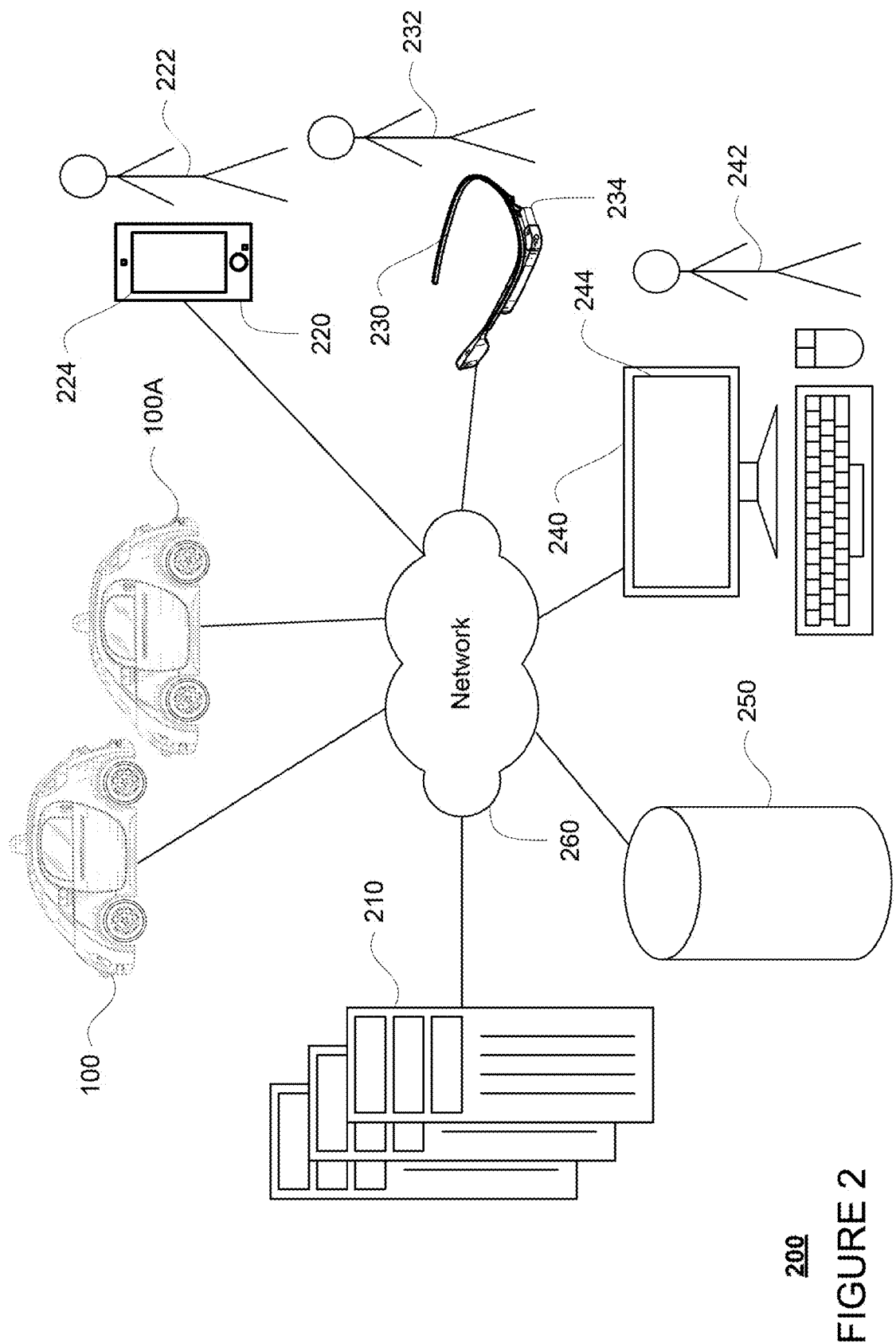
FIG. 2 is a functional diagram of an example system in accordance with an exemplary embodiment.
Figure 3:
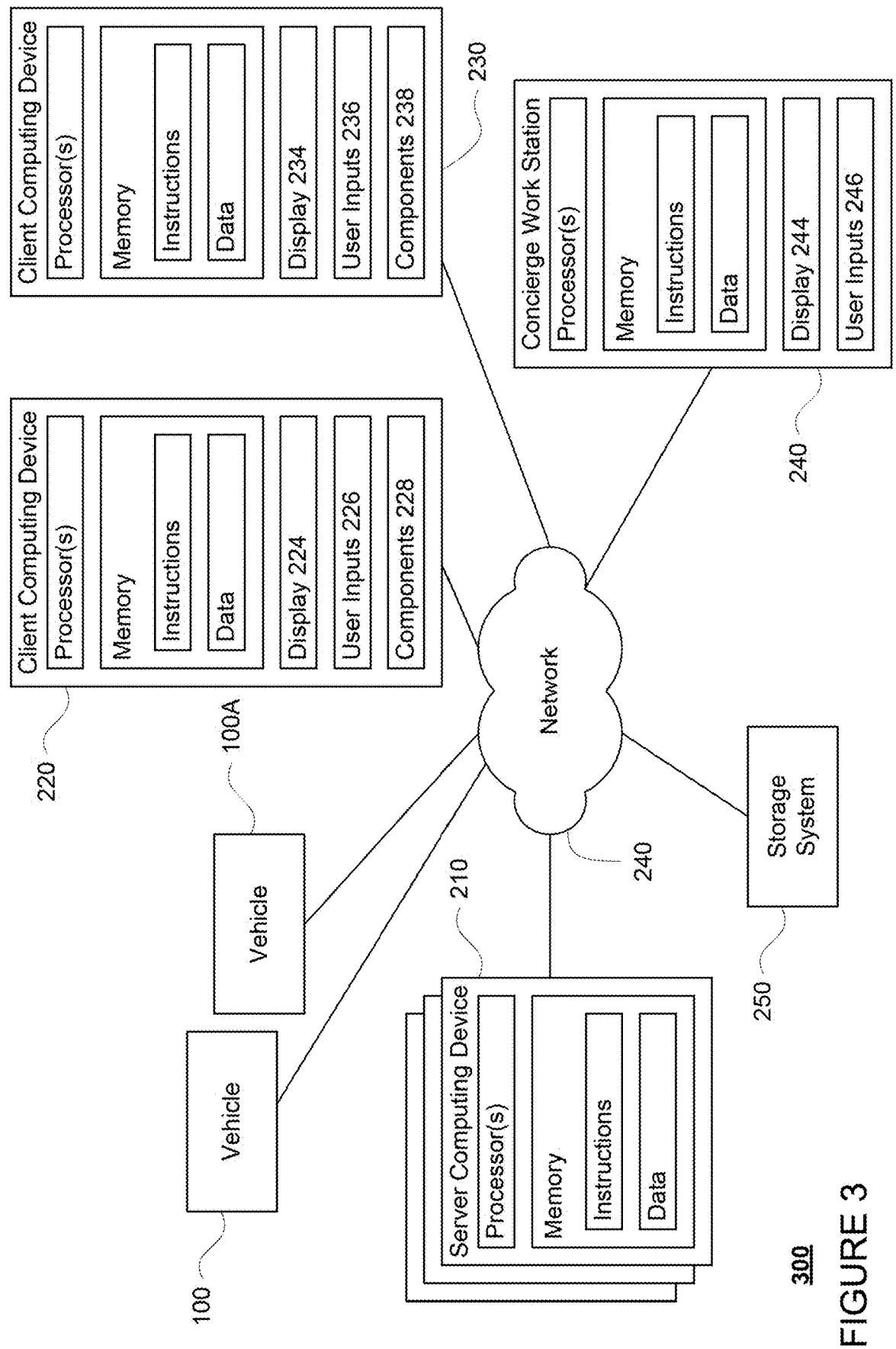
FIG. 3 is a pictorial diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, instructions 132, and data 138 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by one or more server computing devices to various locations. In this regard, the vehicles of the fleet may periodically send the one or more server computing devices location information provided by the vehicle's respective positioning systems and the one or more server computing devices may track the locations of the vehicles.

In addition, one or more server computing devices 210 may use network 260 to transmit and present information to a user, such as user 222, 232, 242 on a display, such as displays 224, 234, 242 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a one or more server computing devices, such as one or more server computing devices 210, in order to perform some or all of the features described herein. For example, the information may include routing data for generating and evaluating routes between locations. The routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. The information may also include a task queue, various tasks, and information associated with the tasks. Tasks may be passenger-related tasks, non-passenger tasks, fallback tasks, and the like.

As with memory 130, storage system 250 can be of any type of computerized storage capable of storing information accessible by the one or more server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Example Methods

In one aspect, a user may download an application for requesting a vehicle to a client computing device. For example, users 222 and 232 may download the application via a link in an email, directly from a website, or an application store to client computing devices 220 and 230. For example, the client computing device may transmit a request for the application over the network, for example, to one or more server computing devices 210, and in response, receive the application. The application may be installed locally at the client computing device.

The user may then use his or her client computing device to access the application and request a vehicle. For example, a user such as user 232 may use client computing device 230 to send a request to one or more server computing devices 210 for a vehicle. This request for a vehicle may be a task request as shown in step 510 in FIG. 5. As an example, the request may be a passenger-related task, or a trip request, that provides information such as a pickup location and a destination location for a trip. As an example, such location may be identified by street addresses, location coordinates, points of interest, etc. For example, map 400 also includes a map pointer 470 corresponding to a destination location D for user 232 and/or client device 230. As discussed below, the vehicle's computing device 110 may then maneuver the vehicle towards the destination location D.

Once the vehicle 100 receives the information dispatching the vehicle to the user from the one or more server computing devices, the vehicle's computing device 110 may use the map 400 to identify the destination location relative to the current location of the vehicle.

In response to receiving the task request, the one or more server computing devices 210 may identify and dispatch, for example based on availability and location, a vehicle to the pickup location. This dispatching may involve sending to the vehicle a passenger-related task request identifying the user (and/or the user's client device), the pickup location, and the destination location or area.

In addition to a passenger-related task request or as an alternative, the one or more server computing devices 210 may send one or more non-passenger task requests to the vehicle's computing device 110. Non-passenger task requests may include instructions to execute a non-passenger task. Non-passenger tasks may include pre-positioning, refueling/recharging, parking, going for maintenance, circling the block, and updating software.

The tasks of any received passenger-related or non-passenger task requests may be stored by the task overseer module 136 of the vehicle's computing device 110 in a queue in one or more computing devices in the vehicle. As shown in step 530, when a task request reaches the top of the queue, task request instructions may be sent to the vehicle self-driving systems 160-172 to cause one or more of the systems to perform the task included in the task request.

The one or more server computing devices 210 may also send information for one or more fallback tasks to a vehicle's computing device 110 in response to and/or along with a passenger-related as shown in step 520. A fallback task request may include instructions to execute a fallback task that the vehicle should perform when the vehicle for whatever reason cannot complete a passenger-related or non-passenger task associated with the fallback task. In this regard, each fallback task may be associated with at least one non-passenger or passenger-related task. The tasks of any received fallback tasks may be stored separately from the queue, for example, in the memory by the fallback selector module 137.

As noted above fallback task may include fallback instructions for performing a fallback task. The nature of the instructions may depend on the nature of a fallback task. For example, for tasks that involve driving to a type of location, such as a charging station or maintenance garage, the location or region may be specified in the fallback instructions. Information may be sent to the vehicle's computing device 110 via the user computing device 220, determined by the vehicle's computing device 110, or hardcoded on the vehicle's computing device 110. In some examples, multiple locations may be hardcoded into the vehicle 100, and the vehicle's computing device 110 may determine which of the multiple locations to travel to after considering relevant factors, such as proximity, services offered, load level, and other considerations. In addition, for tasks that require actions other than driving and parking, such as interaction with an outside system, the instructions may also include action-specific details like authentication information for fueling systems or maintenance depots.

As an example, fallback instructions may identify a base location. A base location may include a location for a vehicle to travel to when no other fallback tasks can be executed. The base location may be sent to the one or more server computing devices 210 from a concierge work station 240. The information may be forwarded from the one or more server computing devices 210 to the vehicle's computing device 110. In another example, the one or more server computing devices 220 may determine that maintenance is needed for a degraded sensor and may also determine the closest maintenance depot that can fix the sensor based on the current location of the vehicle and map data.

Fallback instructions may also include one or more triggers that indicate when a fallback task should be executed. Each trigger may include one or more conditions that, when satisfied, indicate that the vehicle should execute an associated fallback task. Conditions may include, for example, the vehicle's fuel or energy level meeting a predetermined threshold, such as 10%; the connection between the vehicle's computing device and the server of the fleet management device being lost for a set amount of time, such as a minute; the vehicle's task queue being empty; and the time being a set interval before when a regular maintenance is scheduled, such as 30 minutes.

To determine when the condition or conditions of a particular trigger are met, the vehicle self-driving systems 160-172 may transmit status updates, as shown in step 540. These updates may be sent periodically and/or continuously to the vehicle's computing device 110. As an example, the status updates may include information such as the fuel level or other internal or external measurements from instruments or sensors of the vehicle. Based on the received status updates at 540, the vehicle's computing device 110 may determine that the one or more conditions of a trigger are met at step 550. For example, a fuel indicator may continually monitor the level of fuel in the tank. The task overseer module 136 of the vehicle's computing device 110 may set a threshold level for the amount of fuel based on the fuel economy of the vehicle, density of gas stations in the area, and other factors that represents the amount of fuel likely needed to reach a nearby gas station. The threshold may be 10% or more or less. The task overseer module 136 of the vehicle's computing device 110 may then monitor the status of the level of fuel from the updates from the vehicle self-driving systems 160-172 and determine when the fuel has reached the set threshold, such as 10%.

After the condition or conditions of a particular trigger are met, the fallback task corresponding to the trigger may be initiated by sending instructions to execute the fallback task to the vehicle self-driving systems 160-172, as shown at step 560. For example, when the fuel level reaches the threshold as defined as the trigger, such as 10%, the fallback selector module 137 may then send instructions to execute the fallback task of driving to the nearest gas or charging station. This may include determining the location of the nearest gas or charging station based on the current location of the vehicle 100 and the shortest route to that gas or charging station.

Depending on the urgency of a trigger, the fallback task may be executed immediately and therefore interrupting the current task, after the completion of the current task, or after some other task in the queue. Therefore the indication of when a fallback task may be executed may be in the form of a designation of a level of urgency of the trigger. The level of urgency for a given trigger may be set by a human operator. In some examples, the level of urgency may be designated as high, intermediate, or low.

When the level of urgency of the trigger is low, the fallback task may be executed after the task queue has been cleared of all tasks.

A fallback task having a trigger with a low level of urgency may be triggered when the queue is empty of other tasks. For example, after dropping off a passenger and thus completing a passenger-related task, the vehicle 100 may have no other tasks (passenger-related or non-passenger) in the queue. At this time, the vehicle 100 may perform the fallback task received with the passenger-related task. One example of a fallback task having a low level of urgency may include parking nearby and waiting for further instructions and will be described with regard to FIG. 6.

FIG. 6 is an example of a bird's eye view 600 of a geographic area 602 corresponding to the area of map 400. In this example, the geographical area includes various features such as lanes 610-616, intersections 620-626, buildings 630-636, fueling station 638, parking spaces 640-646, a driveway entrance (for example to a parking garage or other location) 650, shoulder areas 652-654, and no parking zone 656 that correspond to each of lanes 410-416, intersections 420-426, buildings 430-436, fueling station 438, parking spaces 440-446, a driveway entrance (for example to a parking garage or other location) 450, shoulder areas 452-454, and no parking zone 456 of the map 400. In this example, map pin 670 is for reference only and identifies the physical location of destination location D.

After dropping off passengers at destination location D, the vehicle 100 may have nothing next in the task queue. This may trigger the fallback task to park nearby and wait for further instructions. In this example, vehicle 100 may determine that parking spaces 640 and 642 are occupied. Vehicle 100 may then drive to lane 614 where parking spaces 644 and 646 are and park at location 620 in vacant parking space 644.

A fallback task having a trigger with an intermediate level of urgency may be triggered after the completion of any passenger-related tasks in the queue, but before any non-passenger related tasks still in the queue are performed. A trigger having an intermediate level of urgency may include the fuel level of vehicle 100 reaching 10% or lower. When this occurs, a fallback task of recharging or refueling may be triggered.

Figure 7:
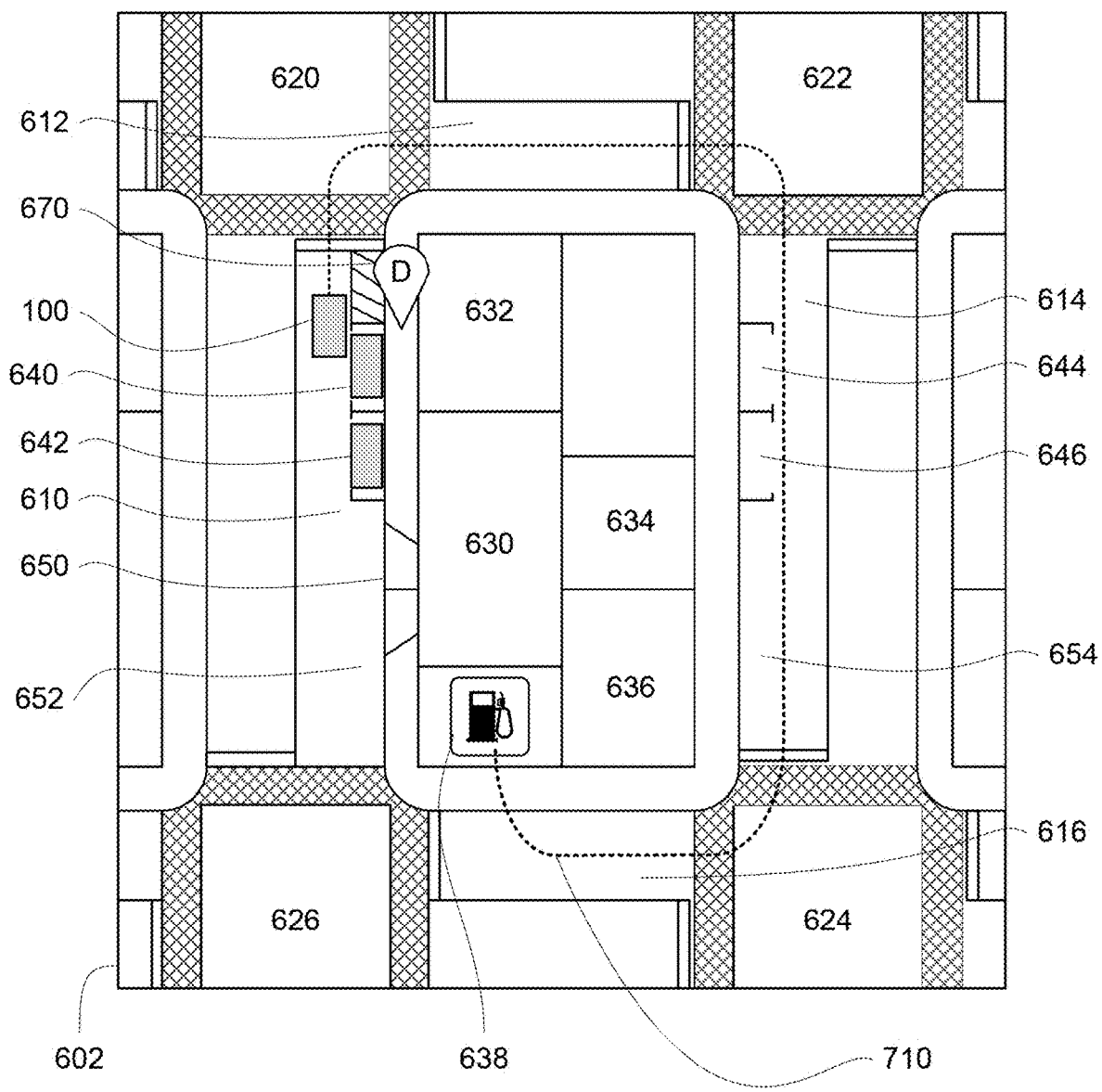
FIG. 7 is another example bird's eye view of a geographic area in accordance with aspects of the disclosure.

As shown in FIG. 7, after the fallback task of refueling is triggered, the vehicle's computing device 110 may determine that there is enough fuel to complete the current passenger-related task, which ends at destination location D, and then drive to fueling station 638. As a result, the fallback task of refueling is executed after dropping passengers off at destination D. The vehicle's computing device 110 may then send instructions to the vehicle self-driving systems 160-172 to drive to fueling station 638.

A fallback task having a trigger with a high level of urgency may be executed immediately, interrupting any passenger-related or non-passenger task. For example, when the level of urgency of the trigger is high, the fallback selector module 137 of the vehicle's computing device 110 may send instructions to end a trip prematurely and proceed to execute the fallback task. A trigger having a high level of urgency may include when there is a problem with the vehicle 100 that can prevent the vehicle 100 from completing a trip. By way of example, a trigger based on the condition of detecting a flat tire would have a high level of urgency because the vehicle 100 may not be able to drive very far on a flat tire. This may thus trigger the fallback task of driving to the nearest maintenance garage.

In the event that a fallback task is triggered, but cannot be executed, the fallback selector module 137 may send instructions to maneuver the autonomous vehicle 100 to a base location, as shown in FIG. 8. Reasons that a fallback task cannot be executed may be that the fallback instructions for performing the fallback task are malformed, the fallback instructions cannot be performed on the type of vehicle to which they were sent, or some other reason. Alternatively, the vehicle 100 may be driven to the base location when no other fallback instructions have been received and the queue is empty.

Turning to FIG. 8, the task request, fallback instructions, task request instructions, and status updates may be transmitted and received as described before in FIG. 5. However, after step 550, when the vehicle's computing device 110 detects the trigger conditions, the vehicle's computing device 110 may determine that the fallback instructions are malformed, or for whatever reason cannot be executed by the vehicle 100 at step 860. The vehicle's computing device 110 may then send instructions to the vehicle self-driving systems 160-172 to drive to a designated base location at step 870, and not to execute the fallback task as before.

The address or location coordinates of the base location may be hardcoded into the vehicle. In some examples, the address or location coordinates of multiple base locations may be hardcoded, allowing the fallback selector module 137 of the vehicle's computing device 110 to select and maneuver the vehicle 100 to the closest or most convenient base location depending on when the fallback task is triggered. In one example, the vehicle 100 will not start if no base location has been set for the vehicle, guaranteeing that there is a location for the vehicle 100 to go to as a last resort whenever the vehicle 100 is in operation, thus reducing the risk of an autonomous vehicle being stranded.

In a situation in which the vehicle 100 may not be able to drive very far, the vehicle 100 may pull over to the side of the road and signal for help. This option may be taken if an autonomous vehicle cannot reach the location specified in the fallback instructions or the base location because of some external and/or internal factors. The fallback selector module 137 of the vehicle's computing device 110 may send instructions to the vehicle self-driving systems 160-172 to pull over and send a message to the one or more server computing devices 210. The message may include the vehicle's location and/or the list of external and/or internal factors.

In some examples, if conditions change such that the condition or conditions of a trigger of a fallback task being currently performed are no longer met, the vehicle may stop executing the fallback task. This determination may be made by the fallback selector module 137. After which, the vehicle may return to executing an interrupted task or execute the next task in the task queue. Alternatively, the vehicle may complete the fallback task before resuming normal operation.

Additionally or alternatively, status update reports may be sent to the one or more server computing devices 210, as shown in FIG. 9. The task request, fallback instructions, and status updates may be transmitted and received as described before. After receiving the status updates at step 540, the vehicle's computing device 110 may then send status update reports to the one or more server computing devices 210 at step 950. This may occur after each receipt of a status update or may be less frequent. At step 960, based on the status update reports, the one or more server computing devices 210 may send updated fallback instructions to the vehicle's computing device 110. The fallback selector module 137 in the vehicle's computing device 110 may replace the previously received fallback instructions with the updated fallback task information. In other examples, the updated fallback task may be stored in the vehicle's computing device along with the previously sent fallback task(s).

In an alternate embodiment, instructions for a set of fallback tasks may be sent to vehicle 100. As with the examples above, each fallback task may be associated with a particular trigger. The instructions may also include a mapping of each trigger to the corresponding fallback task. The fallback selector module 137 may receive and store the mapping locally at the autonomous vehicle 100. Therefore, when the condition or conditions of a trigger occur, the fallback selector module 137 may look up the corresponding fallback task to execute on the mapping. The mapping may also include specifications of a level of urgency of each trigger. When looking up the fallback task, the fallback selector module 137 may also look up the level of urgency of the trigger. The fallback selector module 137 may then determine when the fallback task should be executed based on the level of urgency of the trigger as in the examples above.

Figure 10:
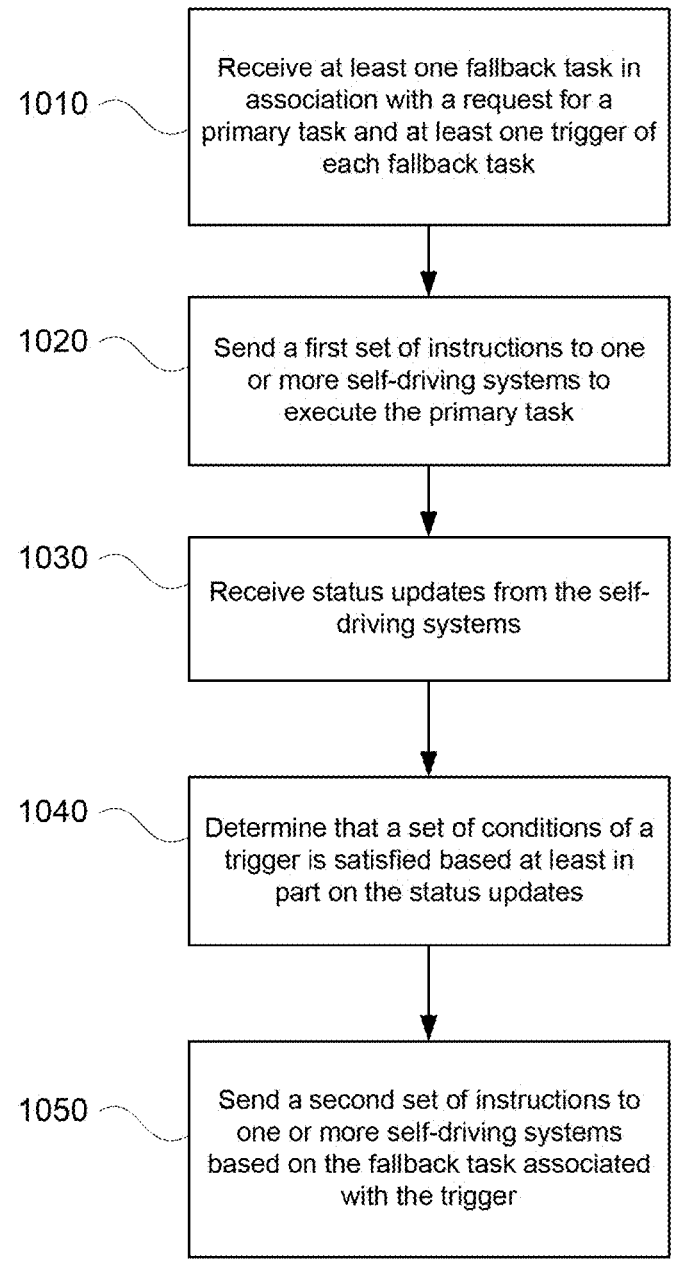
FIG. 10 is an example flow diagram in accordance with aspects of the disclosure.

FIG. 10 is an example flow diagram 1000 in accordance with some of the aspects described above that may be performed by one or more computing devices such as one or more server computing devices 210. However, the features described may be implemented by any of a variety of systems having different configurations. In addition, the operations involved in the methods need not be performed in the precise order described. Rather, various operations may be handled in a different order or simultaneously, and operations may be added or omitted.

At block 1010, at least one fallback task may be received in association with a request for a primary task and at least one trigger of each fallback task. At block 1020, a first set of instructions may be sent to one or more self-driving systems to execute the primary task. At block 1030, status updates may be received from the self-driving systems. At block 1040, based at least in part on the status updates, it may be determined that a set of conditions of a trigger is satisfied. At block 1050, based on the fallback task associated with the trigger, a second set of instructions to one or more self-driving systems may be sent.

The features described above may provide for a comprehensive system of fallback tasks in an autonomous vehicle. This, in turn, may ensure that the vehicle is able to take appropriate steps in various situations in which operation of the vehicle is compromised to some degree without input from a human operator or in the event that the vehicle's computing device is unable to connect with the one or more server computing devices. In particular, certain fallback tasks allow for a vehicle that is still capable of driving a distance to drive autonomously to a specified or determined location. The location may be a place where the vehicle may be restored to full operational capacity. Setting fallback tasks as described above makes it much less likely that the vehicle would get stuck in a cell dead zone. As a result, time, money, and manpower that would have been spent going to retrieve the vehicle are saved.

The features described above also may provide for a way to determine when a fallback task should be executed based on the whether the trigger affects the operation of the vehicle in a major way or is urgent for any other reason. That way, tasks are not unnecessarily interrupted, but are interrupted when the problem with the vehicle is urgent enough to require immediate attention. Sending one or more fallback tasks along with each task request and hardcoding a base location may make it less likely for vehicles to be left stranded in an unknown location. Also, vehicles may get serviced when they need it, and avoid making unnecessary trips for maintenance or not receiving attention when needed. These features therefore provide a simple and effective way to maintain and track a single autonomous vehicle or a fleet of autonomous vehicles.

In addition, the features described above may provide for a system that may operate without continual connection to a remote server. Once tasks are received, the system of the autonomous vehicle disclosed may execute passenger-related, non-passenger, and fallback tasks while not in communication with a management system. The vehicle is free to execute tasks where there may not be a strong connection to the remote server. Tasks may be executed in quick succession without the need to check in with the remove server. These features allow a system managing autonomous vehicles to perform other tasks instead of micromanaging what every vehicle is doing at every moment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system comprising one or more processors configured to:
store, in a memory, a fallback task including instructions for an autonomous vehicle to drive to a fueling or charging station;
store, in the memory, a corresponding trigger for the fallback task, wherein the corresponding trigger includes a threshold for a fuel or energy level of the autonomous vehicle;
receive status updates from one or more self-driving systems that control the autonomous vehicle to drive to the fueling or charging station;
determine that the corresponding trigger is satisfied based at least in part on the status updates;
determine a level of urgency for the corresponding trigger based on an amount of fuel or energy required for a current task being executed by the autonomous vehicle;
determine an execution time for the fallback task according to the level of urgency for the corresponding trigger;
determine a location of a particular fueling or charging station based on the execution time for the fallback task according to the level of urgency for the corresponding trigger; and
cause a given self-driving system of the one or more self-driving systems to control the autonomous vehicle according to the fallback task to drive to the particular fueling or charging station at the execution time.

2. The system of claim 1, wherein the one or more processors are configured to determine that the corresponding trigger is satisfied using an indicator that monitors the fuel or energy level of the autonomous vehicle.

3. The system of claim 1, wherein the one or more processors are further configured to set the threshold for the fuel or energy level based on a fuel or energy economy of the autonomous vehicle.

4. The system of claim 1, wherein the one or more processors are further configured to set the threshold for the fuel or energy level based on a density of fueling or charging stations around the autonomous vehicle.

5. The system of claim 1, further comprising the autonomous vehicle.

6. The system of claim 1, wherein the one or more processors are configured to determine a level of urgency for the corresponding trigger further based on whether the current task is passenger-related or non-passenger related.

7. The system of claim 6, wherein the one or more processors are configured to determine the execution time as a current time when the current task is non-passenger related, and the one or more processors are configured to determine the execution time for the fallback task is after completing the current task when the current task is passenger-related and the autonomous vehicle has enough fuel or energy to complete the current task and drive to a fueling or charging station.

8. A system comprising one or more processors configured to:
store, in a memory, a fallback task including instructions for an autonomous vehicle to drive to a parking spot;
store, in the memory, a corresponding trigger for the fallback task, wherein the corresponding trigger includes detecting that a current task being executed by the autonomous vehicle is completed;
receive status updates from one or more self-driving systems that control the autonomous vehicle to drive to the parking spot;
determine that the corresponding trigger is satisfied based at least in part on the status updates;
determine that the corresponding trigger has a level of urgency that indicates that the fallback task should not interrupt any task in a task queue;
determine an execution time for the fallback task according to the level of urgency for the corresponding trigger and whether any other tasks are in the task queue;
determine a location of a particular parking spot for the execution time based on a location of the autonomous vehicle at the execution time for the fallback task according to the level of urgency for the corresponding trigger; and
cause a given self-driving system of the one or more self-driving systems to control the autonomous vehicle according to the fallback task to drive to the particular parking spot at the execution time.

9. The system of claim 8, wherein the one or more processors are configured to detect that the current task is executed by the autonomous vehicle based on whether a passenger of the autonomous vehicle for a passenger-related task has been dropped off.

10. The system of claim 8, wherein the corresponding trigger indicates that a task queue is empty of all tasks.

11. The system of claim 8, wherein the one or more processors are configured to determine the location of the particular parking spot further based on a detection of an occupied status of one or more parking spots.

12. The system of claim 8, further comprising the autonomous vehicle.

13. A system comprising one or more processors configured to:
   store, in a memory, a fallback task including instructions for an autonomous vehicle to drive to a maintenance depot;
   store, in the memory, a corresponding trigger for the fallback task, wherein the corresponding trigger includes a sensor indication of a vehicle status that affects normal operation of the autonomous vehicle for one or more tasks;
   receive status updates from one or more self-driving systems that control the autonomous vehicle to drive to the maintenance depot;
   determine that the corresponding trigger is satisfied based at least in part on the status updates;
   determine a level of urgency for the corresponding trigger based on the vehicle status;
   determine an execution time for the fallback task according to the level of urgency for the corresponding trigger;
   determine a location of a particular maintenance depot based on the execution time for the fallback task according to the level of urgency for the corresponding trigger; and
   cause a given self-driving system of the one or more self-driving systems to control the autonomous vehicle according to the fallback task to drive to the particular maintenance depot at the execution time.

14. The system of claim 13, wherein the maintenance depot is for a sensor maintenance, and the sensor indication of the vehicle status indicates a degree of sensor degradation.

15. The system of claim 14, wherein the one or more processors are configured to determine the level of urgency based on a length of time or distance the autonomous vehicle can travel with the degree of sensor degradation.

16. The system of claim 15, wherein the one or more processors are configured to determine the level of urgency for the corresponding trigger indicates that the fallback task should be executed after a current task when the current task is passenger-related based when the length of time or distance is greater than required for the current task and driving to the maintenance depot.

17. The system of claim 13, wherein the maintenance depot is for replacing a tire, and the sensor indication of the vehicle status includes an amount of tire pressure that indicates a flat tire.

18. The system of claim 17, wherein the one or more processors are configured to determine the level of urgency based on a length of time or distance the autonomous vehicle can travel with the flat tire.

19. The system of claim 18, wherein the one or more processors are configured to determine the level of urgency for the corresponding trigger indicates that the fallback task should be executed immediately and interrupt any task being currently executed based on the length of time or distance the autonomous vehicle can travel with the flat tire.

20. The system of claim 13, further comprising the autonomous vehicle.

* * * * *